United States Patent
Lu et al.

(10) Patent No.: US 12,282,820 B2
(45) Date of Patent: Apr. 22, 2025

(54) METHOD FOR INVENTORYING TAG AND RELATED DEVICE

(71) Applicant: HUAWEI TECHNOLOGIES CO., LTD., Shenzhen (CN)

(72) Inventors: Zhenwei Lu, Shenzhen (CN); Yiling Wu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/358,414

(22) Filed: Jul. 25, 2023

(65) Prior Publication Data

US 2023/0376704 A1    Nov. 23, 2023

Related U.S. Application Data

(63) Continuation of application No. PCT/CN2022/073634, filed on Jan. 25, 2022.

(30) Foreign Application Priority Data

Jan. 30, 2021    (CN) .......................... 202110132022.3

(51) Int. Cl.
G06Q 30/00    (2023.01)
G06K 7/10    (2006.01)

(52) U.S. Cl.
CPC ................ G06K 7/10108 (2013.01)

(58) Field of Classification Search
CPC ............ G06Q 10/087; G06Q 10/0833; G06K 7/10108; G06K 19/0723; G06K 7/10297; H04W 12/06; H04W 8/24; H04W 12/47

(Continued)

(56) References Cited

U.S. PATENT DOCUMENTS

| | | | |
|---|---|---|---|
| 6,512,478 B1* | 1/2003 | Chien .................. | G08B 25/009 340/572.1 |
| 2002/0183882 A1* | 12/2002 | Dearing ............. | G06K 7/10336 705/28 |

(Continued)

FOREIGN PATENT DOCUMENTS

| CN | 108229230 | * | 6/2018 | ......... G06K 7/10366 |
|---|---|---|---|---|
| CN | 111082908 | * | 4/2020 | ............. H04W 4/40 |
| CN | 111082908 A | | 4/2020 | |

OTHER PUBLICATIONS

EPC Radio-Frequency Identity Protocols Generation-2 UHF RFID Standard, Specification for RFID Air Interface Protocol for Communications at 860 MHZ-960 MHZ, Release 2.1, Jul. 2018, total 157 pages.

(Continued)

*Primary Examiner* — Daniel St Cyr
(74) *Attorney, Agent, or Firm* — HAUPTMAN HAM, LLP

(57) ABSTRACT

A method includes receiving, by a first device, first signaling from a second device, wherein the first signaling is useable to indicate that the second device successfully received first identity information from the first device and is useable to indicate to the first device to send second identity information to the second device, the first signaling comprises a first inventory identifier, and the first inventory identifier is useable to indicate an identifier of an ongoing inventory process of the second device. The method further includes determining, by the first device based on the first signaling, that the first inventory identifier is the same as a second inventory identifier, wherein the second inventory identifier is useable to indicate an identifier of an ongoing inventory process of the first device. The method further includes sending, by the first device, the second identity information to the second device.

18 Claims, 8 Drawing Sheets

(58) Field of Classification Search
USPC ................................. 235/385, 380, 387, 492
See application file for complete search history.

(56) References Cited

U.S. PATENT DOCUMENTS

| | | | | |
|---|---|---|---|---|
| 2003/0115096 | A1* | 6/2003 | Reynolds | G06Q 30/0267 |
| | | | | 705/14.58 |
| 2004/0019893 | A1* | 1/2004 | Hepworth | G06F 9/5055 |
| | | | | 719/310 |
| 2005/0150952 | A1* | 7/2005 | Chung | G08B 13/2471 |
| | | | | 340/8.1 |
| 2006/0095385 | A1* | 5/2006 | Atkinson | G08B 21/0213 |
| | | | | 705/64 |
| 2007/0124077 | A1* | 5/2007 | Hedlund | G06Q 10/087 |
| | | | | 701/300 |
| 2007/0296549 | A1* | 12/2007 | Sato | G06Q 10/087 |
| | | | | 340/572.1 |
| 2008/0122583 | A1 | 5/2008 | Bekritsky | |
| 2018/0165482 | A1 | 6/2018 | Springer et al. | |

OTHER PUBLICATIONS

International Search Report issued in corresponding International Application No. PCT/CN2022/073634, dated Mar. 28, 2022, pp. 1-11.
Extended European Search Report issued in corresponding European Application No. 22745211.7, dated May 27, 2024, pp. 1-8.

* cited by examiner

METHOD FOR INVENTORYING TAG AND RELATED DEVICE

CROSS-REFERENCE TO RELATED APPLICATIONS

This application is a continuation of International Application No. PCT/CN2022/073634, filed on Jan. 25, 2022, which claims priority to Chinese Patent Application No. 202110132022.3, filed on Jan. 30, 2021, the disclosures of the aforementioned applications are hereby incorporated by reference in their entireties.

TECHNICAL FIELD

Embodiments of this application relate to the communication field, and in particular, to a method for inventorying a tag and a related device.

BACKGROUND

Radio frequency identification (radio frequency identification, RFID) is a non-contact automatic identification technology. A target reader (reader) sends an excitation signal to a tag (tag) to supply power to the tag. The tag receives signaling sent by the target reader, and sends signaling to the target reader through a reflected signal. In this manner, the target reader may identify an ID of the tag, and perform operations such as reading and writing on the tag.

In inventory processes of some approaches, a reader implements tag inventory by sending RFID signaling to a tag. The reader supports only inventory of a single process, which has low efficiency of tag inventory.

SUMMARY

One or more embodiments of the present application provide a method for inventorying a tag, to enable a target tag to determine, based on an inventory identifier included in signaling sent by a reader, whether the signaling matches a current ongoing inventory process of the target tag, and thereby prevents mismatched signaling from interfering with a normal inventory process, and improve efficiency of tag inventory.

According to a first aspect of this application, a method for inventorying a tag is provided. The method includes: A first device receives first signaling sent by a second device. The first signaling indicates that the second device successfully receives first identity information sent by the first device and indicates the first device to send second identity information to the second device. The first signaling includes a first inventory identifier. The first inventory identifier indicates an identifier of an ongoing inventory process of the second device. The first device determines, based on the first signaling, that the first inventory identifier is the same as a second inventory identifier. The second inventory identifier indicates an identifier of an ongoing inventory process of the first device. The first device sends the second identity information to the second device.

In some embodiments, the first device receives the first signaling sent by the second device, where the first signaling includes the first inventory identifier. After determining, based on the first signaling, that the first inventory identifier is the same as the second inventory identifier, the first device sends the identity information to the second device. Then, the first device may determine, based on an inventory identifier included in signaling sent by a reader, whether the signaling matches the current ongoing inventory process of the first device, to prevent mismatched signaling from interfering with a normal inventory process. The reader supports a plurality of inventory processes, which improves efficiency of tag inventory.

In some embodiments of the first aspect, the first device receives second signaling sent by the second device. The second signaling indicates that the second device determines that the second identity information is invalid, and the second signaling includes the first inventory identifier.

In some embodiments, in this application, the second signaling indicates that a target reader determines that the second identity information is invalid, and the second signaling includes the first inventory identifier. The second signaling may be a NAK in an inventory process. After receiving a NAK sent by a reader, a target tag determines that a first inventory identifier in the NAK is the same as the second inventory identifier. In other words, it may be considered that the NAK received by the target tag matches the current inventory process of the target tag. Further, the target tag may perform a corresponding action and/or state transition for the NAK. For example, the target reader transitions to an arbitrate state. If the target tag determines that the first inventory identifier in the NAK is different from the second inventory identifier, it may be considered that the NAK received by the target tag is a NAK of another inventory process, and the NAK does not match the current ongoing inventory process of the target tag. Further, the target tag may ignore the NAK, and maintain an original state rather than transition to the arbitrate state. This effectively prevents the NAK of another inventory process from interfering with the current inventory process of the target tag, and improves stability of the target tag in the inventory process.

In some embodiments of the first aspect, the first device receives third signaling sent by the second device, where the third signaling is used to inventory the first identity information of the first device, and the third signaling includes the first inventory identifier; the first device determines, based on the third signaling, that the first inventory identifier is the same as the second inventory identifier; and the first device sends the first identity information to the second device.

In some embodiments, it is assumed that the third signaling is "Query" in a tag inventory process, and the first identity information is an RN16 in the inventory process. After receiving "Query" sent by a reader, the target tag determines that a first inventory identifier in "Query" is the same as the second inventory identifier. In other words, it may be considered that "Query" received by the target tag matches the current ongoing inventory process of the target tag. Further, the target tag may perform a corresponding action and/or state transition for "Query", for example, send the RN16 to the target reader. If the target tag determines that the first inventory identifier in "Query" is different from the second inventory identifier, it may be considered that "Query" received by the target tag does not match the current ongoing inventory process of the target tag. Further, the target tag may ignore "Query", and does not perform state transition or any processing, for example, does not send the RN16 to the target reader. In this implementation, "Query" of another inventory process is effectively prevented from interfering with the current inventory process of the target tag, and stability of the target tag in the inventory process is improved.

In some embodiments of the first aspect, the first signaling includes an ID of the second device, and that the first device sends the second identity information to the second device includes: The first device determines, that a response list stored by the first device includes the identity ID of the second device; and the first device sends the second identity information to the second device.

In some embodiments, it is assumed that the first signaling is an ACK in a tag inventory process, the first identity information is an RN16 in the inventory process, and the second identity information is an EPC in the inventory process. After receiving an ACK sent by a reader, the target tag determines that a first inventory identifier in the ACK is the same as the second inventory identifier, and determines that the response list stored by the target tag includes an identity ID of the target reader, or the target tag determines that an identity of the reader, in the inventory process in which the target tag participates, matches the identity of the target reader that sends the signaling. In other words, it may be considered that the ACK received by the target tag matches the current ongoing inventory process of the target tag. Further, the target tag may perform a corresponding action and/or state transition for the ACK, for example, send the EPC to the target reader. The response list may include IDs of one or more readers. This is not specifically limited herein. It is assumed that the target tag determines that the first inventory identifier in the ACK is different from the second inventory identifier, or determines that the response list stored by the target tag does not include the identity ID of the target reader, or the target tag determines that the identity of the reader, in the inventory process in which the target tag participates, does not match the identity of the target reader that sends the signaling. In other words, it may be considered that the ACK received by the target tag does not match the current ongoing inventory process of the target tag. Further, the target tag may ignore the ACK, and does not perform state transition or any processing for the ACK. This further prevents the ACK of another inventory process from interfering with the current inventory process of the target tag, and increases a capacity of the ACK.

In some embodiments of the first aspect, the third signaling includes the ID of the second device, and that the first device sends the first identity information to the second device includes: The first device determines that the response list stored by the first device includes the ID of the second device; and the first device sends the first identity information to the second device.

In some embodiments, it is assumed that the third signaling is "Query" in a tag inventory process, and the first identity information is an RN16 in the inventory process. After receiving "Query" sent by a reader, the target tag determines that a first inventory identifier in "Query" is the same as the second inventory identifier, and determines that the response list stored by the target tag includes the identifier ID of the target reader. In other words, it may be considered that "Query" received by the target tag matches the current ongoing inventory process of the target tag. Further, the target tag may perform a corresponding action and/or state transition for "Query", for example, send the RN16 to the target reader. If the target tag determines that the first inventory identifier in "Query" is different from the second inventory identifier, or determines that the response list stored by the target tag does not include the identity ID of the target reader, it may be considered that "Query" received by the target tag does not match the current ongoing inventory process of the target tag. Further, the target tag may ignore "Query", and does not send the RN16 to the target reader. This further prevents "Query" of another inventory process from interfering with the current inventory process of the target tag, and increases a capacity of "Query".

In some embodiments of the first aspect, the second signaling includes the ID of the second device.

In some embodiments, it is assumed that the second signaling is a NAK in an inventory process. After receiving a NAK sent by a reader, the target tag determines that a first inventory identifier in the NAK is the same as the second inventory identifier, and determines that the response list stored by the target tag includes the identity ID of the target reader, or the target tag determines that an identity of the reader, in the inventory process in which the target tag participates, matches the identity of the target reader that sends the signaling. In other words, it may be considered that the ACK received by the target tag matches the current ongoing inventory process of the target tag. Further, the target tag may perform a corresponding action and/or state transition for the NAK. For example, the target reader transitions to the arbitrate state. If the target tag determines that the first inventory identifier in the NAK is different from the second inventory identifier, or determines that the response list stored by the target tag does not include the identity ID of the target reader, it may be considered that the NAK received by the target tag is a NAK of another inventory process, and the NAK does not match the current ongoing inventory process of the target tag. Further, the target tag may ignore the NAK, and maintain an original state rather than transition to the arbitrate state. This further prevents the NAK of another inventory process from interfering with the current inventory process of the target tag, and increases a capacity of the NAK.

In some embodiments of the first aspect, the tag is in a reply state or an acknowledged state before the first device receives the first signaling, the second signaling, and/or the third signaling.

According to a second aspect of this application, a method for inventorying a tag is provided. The method includes: A second device sends first signaling to a first device. The first signaling indicates that the second device successfully receives first identity information sent by the first device and indicates the first device to send second identity information to the second device. The first signaling includes a first inventory identifier. The first inventory identifier indicates an identifier of an ongoing inventory process of the second device. The second device receives the second identity information sent by the first device.

In some embodiments, the second device sends the first signaling to the first device, where the first signaling includes the first inventory identifier. The first device determines, based on the first signaling, that the first inventory identifier is the same as a second inventory identifier. Then, the second device receives the second identity information sent by the first device. Then, the first device may determine, based on an inventory identifier included in signaling sent by a reader, whether the signaling matches a current ongoing inventory process of the first device, to prevent mismatched signaling from interfering with a normal inventory process. The reader supports a plurality of inventory processes, which improves efficiency of tag inventory.

In some embodiments of the second aspect, the second device sends second signaling to the first device. The second signaling indicates that the second device determines that the second identity information is invalid, and the second signaling includes the first inventory identifier.

In some embodiments, in this application, the second signaling indicates that a target reader determines that the second identity information is invalid, and the second signaling includes the first inventory identifier. The second signaling may be a NAK in an inventory process. After receiving a NAK sent by a reader, a target tag determines that a first inventory identifier in the NAK is the same as the second inventory identifier. In other words, it may be considered that the NAK received by the target tag matches the current inventory process of the target tag. Further, the target tag may perform a corresponding action and/or state transition for the NAK. For example, the target reader transitions to an arbitrate state. If the target tag determines that the first inventory identifier in the NAK is different from the second inventory identifier, it may be considered that the NAK received by the target tag is a NAK of another inventory process, and the NAK does not match the current ongoing inventory process of the target tag. Further, the target tag may ignore the NAK, and maintain an original state rather than transition to the arbitrate state. This effectively prevents the NAK of another inventory process from interfering with the current inventory process of the target tag, and improves stability of the target tag in the inventory process.

In some embodiments of the second aspect, the second device sends third signaling to the first device, where the third signaling is used to inventory the first identity information of the first device, and the third signaling includes the first inventory identifier; and the second device receives the first identity information sent by the first device.

In some embodiments, it is assumed that the third signaling is "Query" in a tag inventory process, and the first identity information is an RN16 in the inventory process. After receiving "Query" sent by the reader, the target tag determines that the first inventory identifier in "Query" is the same as the second inventory identifier. In other words, it may be considered that "Query" received by the target tag matches the current ongoing inventory process of the target tag. Further, the target tag may perform a corresponding action and/or state transition for "Query", for example, send the RN16 to the target reader. If the target tag determines that the first inventory identifier in "Query" is different from the second inventory identifier, it may be considered that "Query" received by the target tag does not match the current ongoing inventory process of the target tag. Further, the target tag may ignore "Query", and does not perform state transition or any processing, for example, does not send the RN16 to the target reader. In this implementation, "Query" of another inventory process is effectively prevented from interfering with the current inventory process of the target tag, and stability of the target tag in the inventory process is improved.

In some embodiments of the second aspect, the first signaling, the second signaling, and/or the third signaling include/includes an ID of the second device.

In some embodiments, it is assumed that the first signaling is an ACK in a tag inventory process, the first identity information is an RN16 in the inventory process, and the second identity information is an EPC in the inventory process. After receiving an ACK sent by a reader, the target tag determines that a first inventory identifier in the ACK is the same as the second inventory identifier, and determines that a response list stored by the target tag includes an identity ID of the target reader, or the target tag determines that an identity of the reader, in the inventory process in which the target tag participates, matches the identity of the target reader that sends the signaling. In other words, it may be considered that the ACK received by the target tag matches the current ongoing inventory process of the target tag. Further, the target tag may perform a corresponding action and/or state transition for the ACK, for example, send the EPC to the target reader. The response list may include IDs of one or more readers. This is not specifically limited herein. It is assumed that the target tag determines that the first inventory identifier in the ACK is different from the second inventory identifier, or determines that the response list stored by the target tag does not include the identity ID of the target reader, or the target tag determines that the identity of the reader, in the inventory process in which the target tag participates, does not match the identity of the target reader that sends the signaling. In other words, it may be considered that the ACK received by the target tag does not match the current ongoing inventory process of the target tag. Further, the target tag may ignore the ACK, and do not perform state transition or any processing for the ACK. This further prevents the ACK of another inventory process from interfering with the current inventory process of the target tag, and increases a capacity of the ACK.

In some embodiments, it is assumed that the second signaling is a NAK in an inventory process. After receiving a NAK sent by a reader, the target tag determines that a first inventory identifier in the NAK is the same as the second inventory identifier, and determines that the response list stored by the target tag includes the identity ID of the target reader, or the target tag determines that an identity of the reader, in the inventory process in which the target tag participates, matches the identity of the target reader that sends the signaling. In other words, it may be considered that the ACK received by the target tag matches the current ongoing inventory process of the target tag. Further, the target tag may perform a corresponding action and/or state transition for the NAK. For example, the target reader transitions to the arbitrate state. If the target tag determines that the first inventory identifier in the NAK is different from the second inventory identifier, or determines that the response list stored by the target tag does not include the identity ID of the target reader, it may be considered that the NAK received by the target tag is a NAK of another inventory process, and the NAK does not match the current ongoing inventory process of the target tag. Further, the target tag may ignore the NAK, and maintain an original state rather than transition to the arbitrate state. This further prevents the NAK of another inventory process from interfering with the current inventory process of the target tag, and increases a capacity of the NAK.

In some embodiments, it is assumed that the third signaling is "Query" in a tag inventory process, and the first identity information is an RN16 in the inventory process. After receiving "Query" sent by a reader, the target tag determines that a first inventory identifier in "Query" is the same as the second inventory identifier, and determines that the response list stored by the target tag includes the identifier ID of the target reader. In other words, it may be considered that "Query" received by the target tag matches the current ongoing inventory process of the target tag. Further, the target tag may perform a corresponding action and/or state transition for "Query", for example, send the RN16 to the target reader. If the target tag determines that the first inventory identifier in "Query" is different from the second inventory identifier, or determines that the response list stored by the target tag does not include the identity ID of the target reader, it may be considered that "Query" received by the target tag does not match the current ongoing inventory process of the target tag. Further, the target tag may ignore "Query", and does not send the RN16 to the target reader. This further prevents "Query" of another inventory process from interfering with the current inventory process of the target tag, and increases a capacity of "Query".

It can be learned from the foregoing technical solutions that embodiments of this application have the following advantages:

In some embodiments, a first device receives first signaling sent by a second device, where the first signaling includes a first inventory identifier. After determining, based on the first signaling, that the first inventory identifier is the same as a second inventory identifier, the first device sends identity information to the second device. Then, the first device may determine, based on an inventory identifier included in signaling sent by a reader, whether the signaling matches a current ongoing inventory process of the first device. This prevents mismatched signaling from interfering with a normal inventory process, and improves efficiency of tag inventory.

DETAILED DESCRIPTION

The following describes examples provided in this application with reference to the accompanying drawings. It is clear that the described examples are merely some but not all of the examples in this application. A person of ordinary skill in the art may learn that, with technology development and emergence of a new scenario, the technical solutions provided in this application are also applicable to a similar technical problem.

In this specification, claims, and the accompanying drawings of this application, the terms "first", "second", and the like are intended to distinguish between similar objects but do not necessarily indicate a specific order or sequence. It should be understood that the data termed in such a way are interchangeable in proper circumstances, so that examples described herein can be implemented in an order other than the order illustrated or described herein. Moreover, the terms "include", "contain" and any variant thereof are intended to cover a non-exclusive inclusion. For example, a process, method, system, product, or device that includes a list of steps or units is not necessarily limited to those steps or units that are expressly listed, but may include other steps or units not expressly listed or are inherent to the process, method, product, or device.

In this application, in the following method examples, a target tag and a tag are used as examples to describe a first device, and a target reader and a reader are used as examples to describe a second device. In actual application, the first device and the second device may alternatively be other types of network devices. This is not specifically limited herein.

Figure 1:
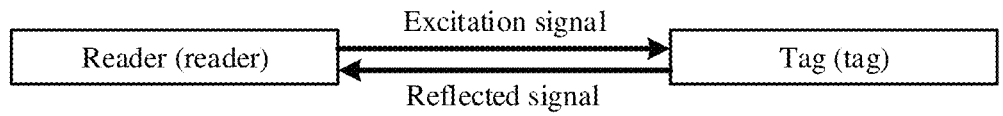
FIG. 1 is a schematic diagram of an embodiment of a tag and a reader according to this application.

FIG. 1 is a schematic diagram of an embodiment of a tag and a reader according to this application.

Refer to FIG. 1. An RFID technology is a non-contact automatic identification technology. A reader sends an excitation signal to a low-cost tag to supply power to the tag. The tag receives signaling sent by the reader, and sends signaling to the reader through a reflected signal. In this manner, the reader may identify an ID of the tag, and perform read and write operations on the tag. The reader may further perform other operations on the tag, which is not specifically limited herein.

Figure 2:
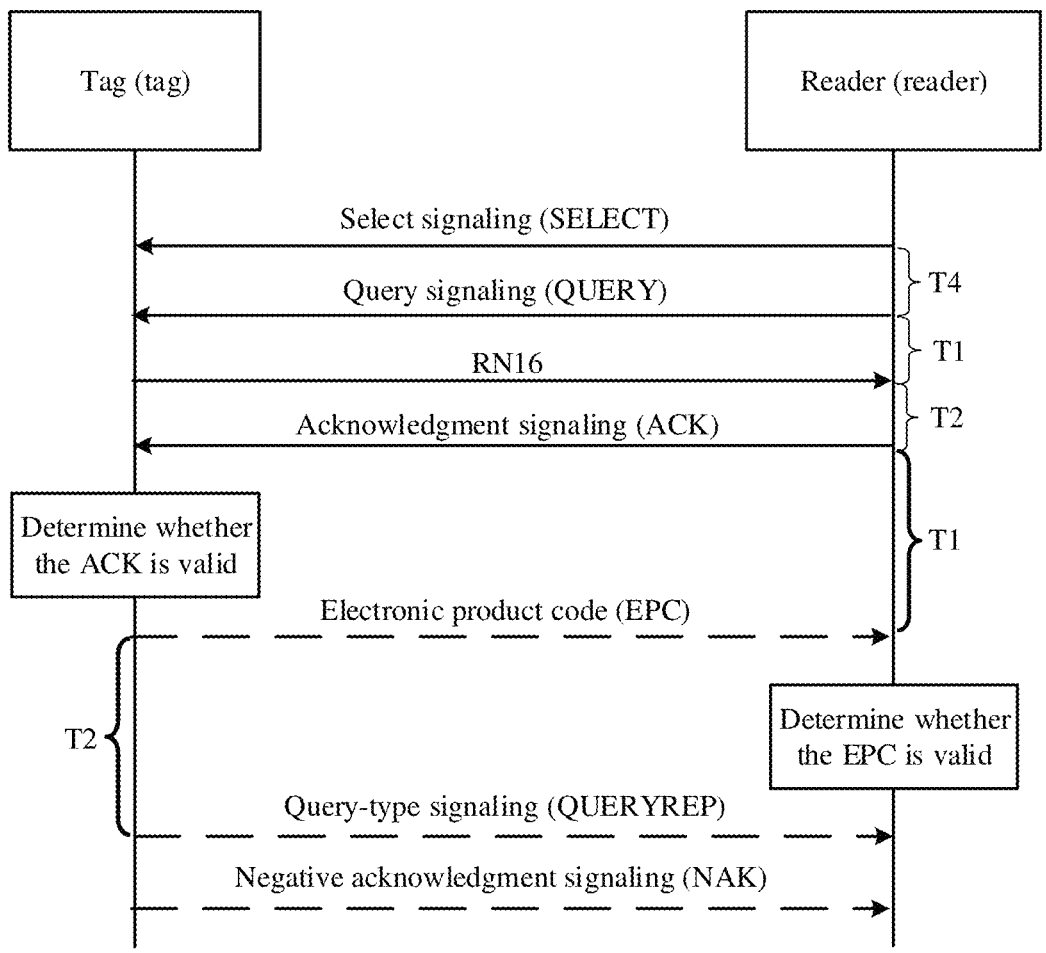
FIG. 2 is a schematic diagram of an embodiment of an inventory process according to this application.

FIG. 2 is a schematic diagram of an embodiment of an inventory process according to this application.

Refer to FIG. 2. The following briefly describes the inventory process in FIG. 2.

A reader sends select signaling (Select) to a tag, where "Select" is used to select a subset of the tag. The subset of the tag includes one or more tags. An inventoried flag of a session (session) in the subset is modified.

The reader sends query signaling (Query) to the tag, where "Query" is used to select one session from a plurality of sessions, and select a tag that matches an inventoried flag in the session. Then, the inventory process is initialized. Each of the tags selects a random number to initialize a counter (counter).

The tag sends RN16 signaling to the reader, where the RN16 indicates a temporary identity (identity, ID) of the tag. After the tag receives the query signaling, if the tag determines that counter=0, the tag selects a 16-bit random number as the RN16, and feeds back the RN16 to the reader. If the reader detects that the tag feeds back the RN16, it indicates that the inventory process is normally performed. The reader performs a next action.

The reader sends acknowledgment signaling (ACK) to the tag. The ACK indicates that the reader successfully receives the RN16 sent by the tag. The ACK includes the 16-bit random number previously sent by the tag, which is used by the tag to check whether the ACK matches.

If the tag determines that the 16-bit random number included in the acknowledgment ACK is the same as the RN16 sent by the tag, the tag sends an electronic product code (electronic product code, EPC) to the reader. The EPC indicates a real ID of the tag.

If the reader determines that the EPC sent by the tag is valid, the reader sends query-type signaling (QueryRep or QueryAdjust) to the tag. The counter of each of the tags that receive the query-type signaling is decremented by 1, or the counter is initialized by a random number reselected based on QueryAdjust. Then, inventory of the tag is completed.

If the reader determines that the EPC sent by the tag is invalid, the reader sends negative acknowledgment signaling (Negative acknowledgment, NAK) to the tag.

Figure 3:
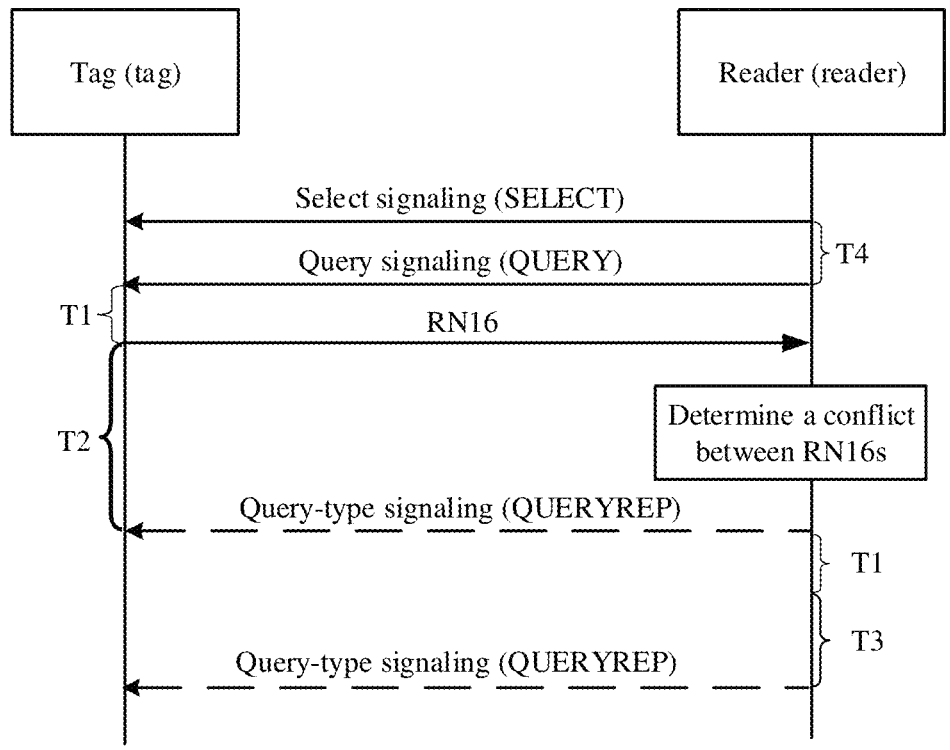
FIG. 3 is a schematic diagram of another embodiment of an inventory process according to this application.

FIG. 3 is a schematic diagram of another embodiment of an inventory process according to this application.

Refer to FIG. 3. The following briefly describes the inventory process in FIG. 3.

In this application, a function of sending, by a reader, "Select" and "Query" to a tag, and a function of sending, by the tag, an RN16 to the reader are similar to those in the embodiment shown in FIG. 2. Details are not described herein again.

When a plurality of tags send the RN16 to the reader, if the reader determines that a conflict occurs between RN16s sent by the plurality of tags, the reader does not send ACKs to the tags, but directly sends QueryRep. In other words, these conflicting tags are skipped and the reader directly performs a subsequent inventory process. In addition, if the reader does not detect the RN16 sent by the tag, the reader also directly performs the subsequent inventory process (for example, sending QueryRep).

The following briefly describes a time interval in embodiments shown in FIG. 2 and FIG. 3.

In this application, T1 is a time interval between a time point when a reader finishes sending signaling and a time point when a tag starts sending signaling. T4 is a time interval between a time point when the reader finishes sending a piece of signaling and a time point when a next piece of signaling is started (the tag does not feed back signaling during the time interval). T3 is an extra delay that the reader needs to wait when there is no feedback from the tag in an inventory process. T2 is a time interval between a time point when the tag finishes sending signaling and a time point when the reader starts sending signaling.

In an existing inventory process, a reader implements tag inventory by sending RFID signaling to a tag. The reader supports only inventory of a single process, which has low efficiency of tag inventory.

To resolve a problem existing in the foregoing solution, this application provides a method for inventorying a tag. In this application, a first device receives first signaling sent by a second device, where the first signaling includes a first inventory identifier. After determining, based on the first signaling, that the first inventory identifier is the same as a second inventory identifier, the first device sends identity information to the second device. Then, the first device may determine, based on an inventory identifier included in signaling sent by a reader, whether the signaling matches a current ongoing inventory process of the first device, to prevent mismatched signaling from interfering with a normal inventory process. The reader supports a plurality of inventory processes, which improves efficiency of tag inventory.

Figure 4:
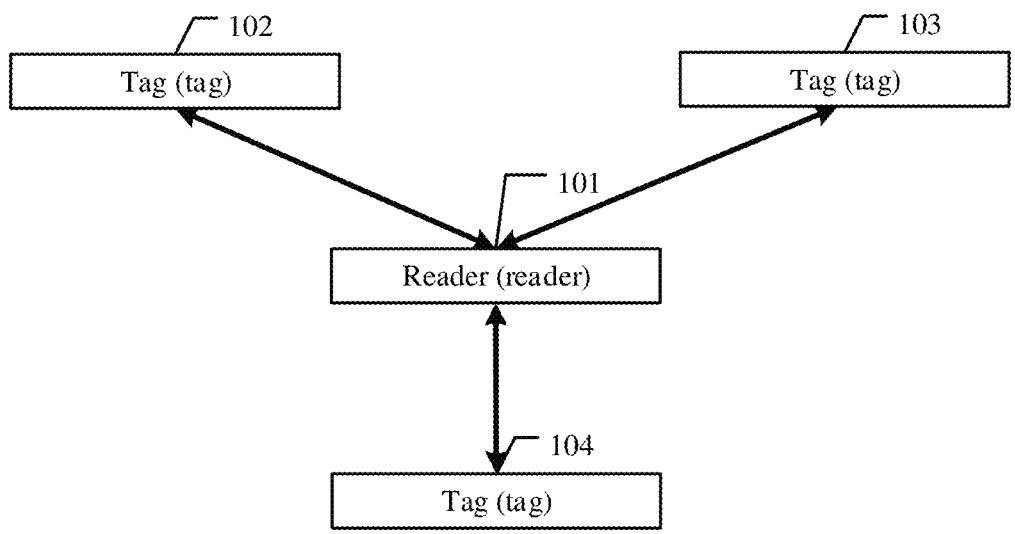
FIG. 4 is a schematic diagram of application of a network system according to this application.

FIG. 4 is a schematic diagram of application of a network system according to this application.

Refer to FIG. 4. A network system provided in this application includes a reader 101, a tag 102, a tag 103, and a tag 104.

In this application, the reader 101 communicates with the tag 102, the tag 103, and the tag 104. Optionally, the reader 101 may inventory one of the tag 102, the tag 103, and the tag 104 at a time moment, or the reader may inventory a plurality of the tag 102, the tag 103, and the tag 104 at a time moment. This is not specifically limited herein.

In this application, a form of the reader may be a centralized architecture, or the form of the reader may be a split architecture. This is not specifically limited herein. The following examples describe two different forms of readers.

Figure 5:
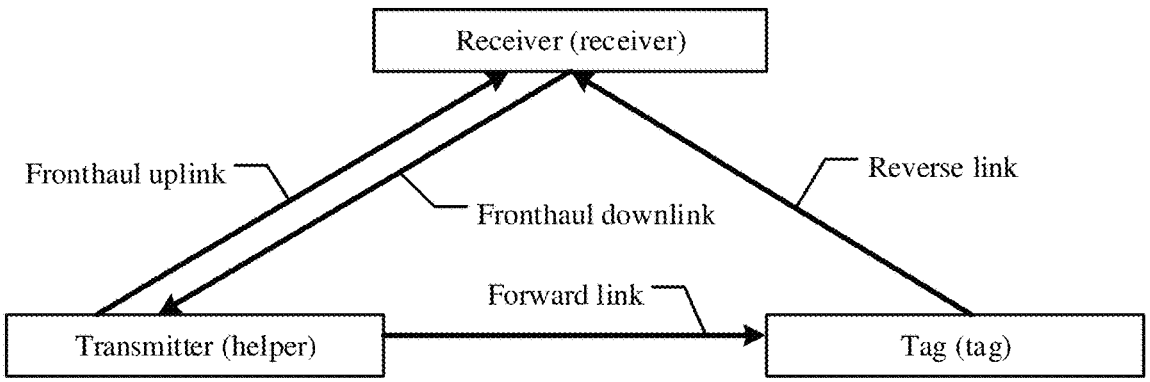
FIG. 5 is a schematic diagram of another embodiment of a tag and a reader according to this application.

FIG. 5 is a schematic diagram of another embodiment of a tag and a reader according to this application.

Refer to FIG. 5. The reader, in a split architecture, is divided into two parts: a transmitter (helper) and a receiver (receiver). The transmitter may send an excitation signal to the tag over a forward link. The receiver may receive, over a reverse link, a reflected signal sent by the tag. In addition, after generating RFID signaling, the receiver sends the RFID signaling to the transmitter through fronthaul downlink, and the transmitter forwards the RFID signaling to the tag over the forward link. Optionally, the fronthaul link between the transmitter and the receiver may be used to transmit signaling by using a 5th generation new radio (5th-Generation New Radio, 5G NR) technology, the fronthaul link between the transmitter and the receiver may be used to transmit signaling by using a 5th generation sidelink (5G sidelink) technology, or the fronthaul link between the transmitter and the receiver may alternatively be used to transmit signaling by using another technology. This is not specifically limited herein.

Figure 6:
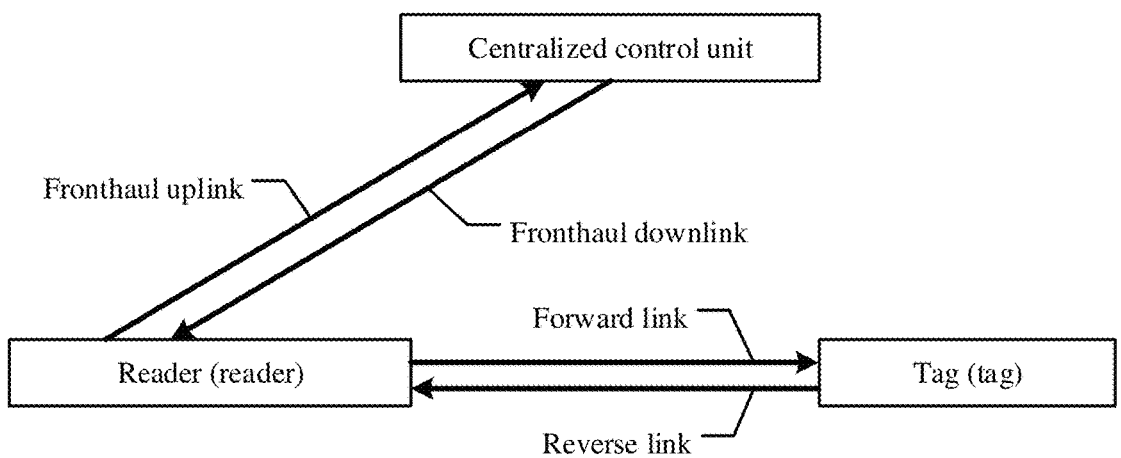
FIG. 6 is a schematic diagram of still another embodiment of a tag and a reader according to this application.

FIG. 6 is a schematic diagram of still another embodiment of a tag and a reader according to this application.

Refer to FIG. 6. The reader, in a centralized or integrated architecture, may further communicate with a centralized control unit in addition to participating in excitation and reflection of a signal with the tag through a forward link and a reverse link. The centralized control unit may perform scheduling, control, or the like on a resource of the forward link used by the reader and sending behavior of the reader, as shown in FIG. 6. In this application, a fronthaul link between the reader and the centralized control unit may be used to transmit signaling by using a 5G NR technology, the fronthaul link between the reader and the centralized control unit may be used to transmit signaling by using a 5G sidelink technology, or the fronthaul link between the reader and the centralized control unit may alternatively be used to transmit signaling by using another technology. This is not specifically limited herein. In this application, the centralized control unit may be a base station, or the centralized control unit may be another network device. This is not specifically limited herein.

Figure 7:
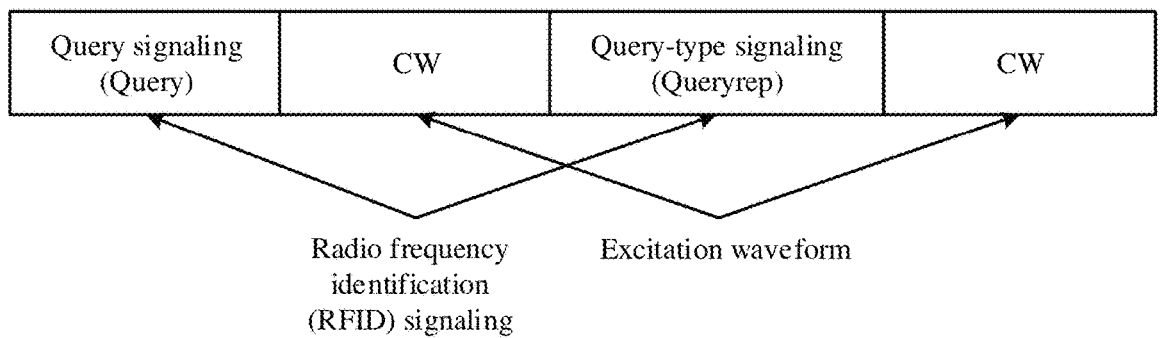
FIG. 7 is a schematic diagram of an embodiment in which a transmitter sends signaling according to this application.

FIG. 7 is a schematic diagram of an embodiment in which a reader sends signaling according to this application.

In this application, according to an RFID protocol, the reader performs continuous transmission over a forward link, sends an excitation signal waveform continuous wave (Continuous Wave, CW), or sends RFID signaling (such as Query or QueryRep).

A network system provided in this application is described by merely using the network system including the reader 101, the tag 102, the tag 103, and the tag 104 shown in FIG. 4 as an example. Optionally, in actual application, the network system provided in this application may include more readers, and the network system provided in this application may further include more or fewer tags than those in the example in FIG. 2. This is not specifically limited herein.

Based on the network system described in FIG. 4, a method for inventorying a tag provided in this application is described.

Figure 8:
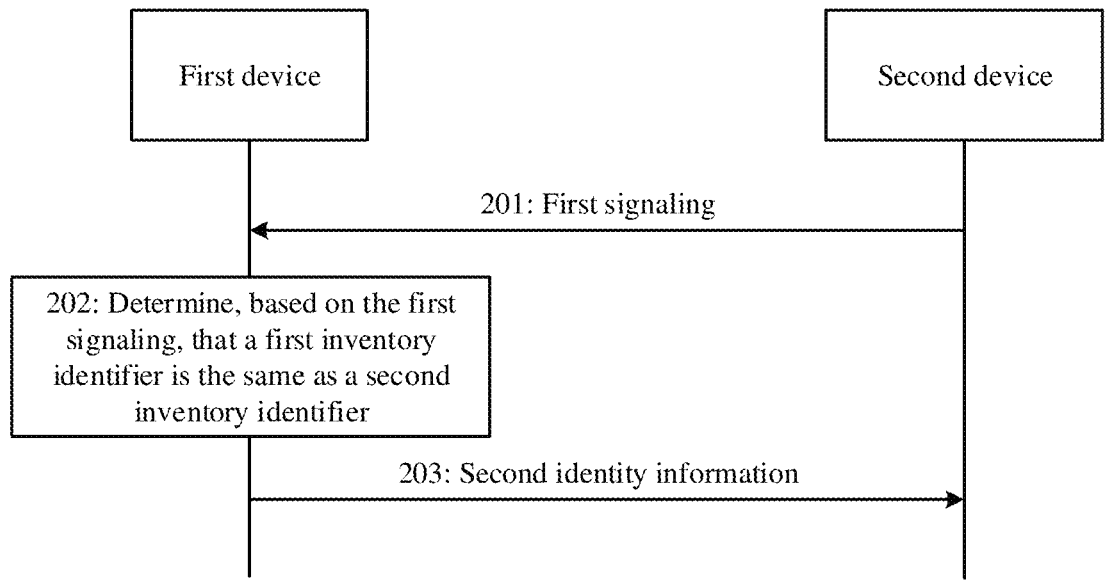
FIG. 8 is a schematic diagram of an embodiment of a method for inventorying a tag according to this application.

FIG. 8 is a schematic diagram of an embodiment of a method for inventorying a tag according to this application.

Refer to FIG. 8. An embodiment of the method for inventorying a tag provided in this application includes step 201 to step 203. The following describes the technical solution provided in this application by using an example in which a target tag is a first device and a target reader is a second device.

201: The first device receives first signaling sent by the second device. Correspondingly, the second device sends the first signaling to the first device.

In this application, the first signaling indicates that the target reader successfully receives first identity information sent by the target tag and indicates the target tag to send second identity information to the target reader. The first signaling includes a first inventory identifier, where the first inventory identifier indicates an identifier of an ongoing inventory process of the target reader.

For example, the first signaling may be acknowledgment signaling (acknowledgment, ACK) in a tag inventory process, the first identity information may be an RN16 in the inventory process, and the second identity information may be an EPC in the inventory process.

In this application, the ACK may include a first inventory identifier, where the first inventory identifier may indicate a number of a current ongoing inventory process of a reader. The first inventory identifier may be carried in the ACK signaling in a plurality of forms. The first inventory identifier may be carried in a packet header of the ACK signaling. The first inventory identifier may be carried in a load part of the ACK signaling. The first inventory identifier may alternatively be carried in a packet trailer of the ACK signaling. This is not specifically limited herein.

In this application, the first inventory identifier may optionally be a session sequence number in the inventory process, or the first inventory identifier may be in another implementation form. This is not specifically limited herein.

202: The first device determines, based on the first signaling, that the first inventory identifier is the same as a second inventory identifier.

In this application, the second inventory identifier indicates an identifier of an ongoing inventory process of the target tag.

203: The first device sends the second identity information to the second device. Correspondingly, the second device receives the second identity information sent by the first device.

In this application, it is assumed that the first signaling is an ACK in a tag inventory process, the first identity information is an RN16 in the inventory process, and the second identity information is an EPC in the inventory process. After receiving the ACK sent by the reader, the target tag determines that the first inventory identifier in the ACK is the same as the second inventory identifier. In other words, it may be considered that the ACK received by the target tag matches the current ongoing inventory process of the target tag. Further, the target tag may perform a corresponding action and/or state transition for the ACK, for example, send the EPC to the target reader. If the target tag determines that the first inventory identifier in the ACK is different from the second inventory identifier, it may be considered that the ACK received by the target tag does not match the current ongoing inventory process of the target tag. Further, the target tag may ignore the ACK, and does not perform state transition or any action, for example, does not send the EPC to the target reader.

Figure 9:
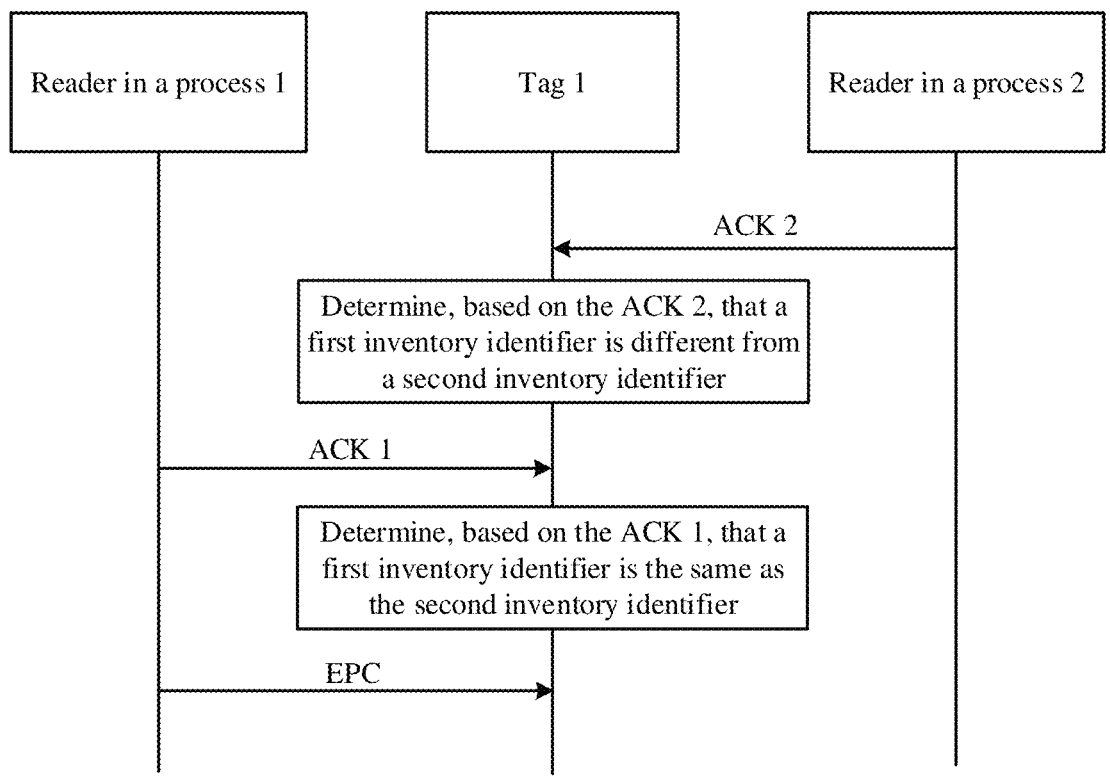
FIG. 9 is a schematic diagram of another embodiment of a method for inventorying a tag according to this application.

FIG. 9 is a schematic diagram of another embodiment of a method for inventorying a tag according to this application.

For example, when a tag 1 in an inventory process 1 receives an ACK 2 of an inventory process 2, a current inventory process is not interrupted. As shown in the following figure, after the tag 1 in the inventory process 1 feeds back an RN16, the tag 1 waits for an ACK 1 that is sent by a reader to the tag 1. At this time, the tag 1 is in a reply (reply) state. However, the ACK 2 that is sent by the reader in the inventory process 2 to a tag 2 is received. As the ACK 2 includes a first inventory identifier, after receiving the ACK 2, the tag 1 finds that the first inventory identifier included in the ACK 2 is different from a second inventory identifier. Further, the ACK 2 does not match the ongoing inventory process of the tag 1, and the tag 1 does not transition to an arbitrate state. Subsequently, the ACK 1 sent by the reader is received. After it is determined that a first inventory identifier included in the ACK 1 is the same as the second inventory identifier, an EPC is sent to the reader in response.

In this application, in the method for inventorying a tag provided in this application, the target tag, in addition to implementing step 201 to step 203, may further receive second signaling sent by a target reader. The specific implementation is described in the following method example.

The target tag receives the second signaling sent by the target reader.

Figure 10:
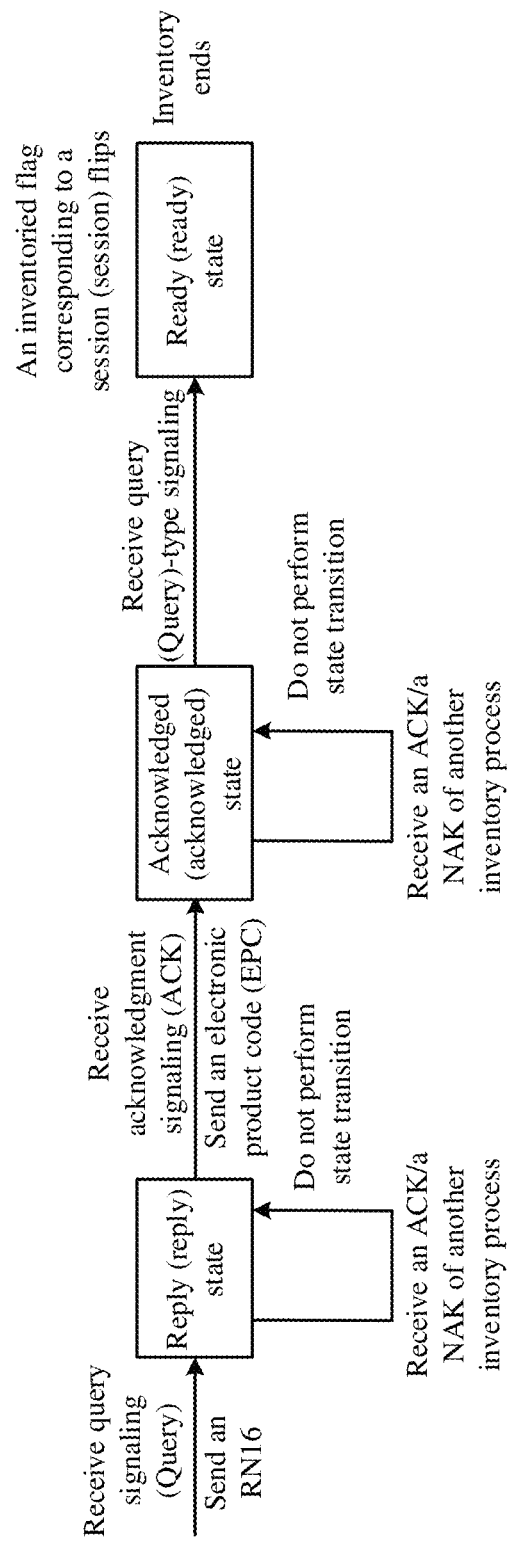
FIG. 10 is a schematic diagram of still another embodiment of a method for inventorying a tag according to this application.

FIG. 10 is a schematic diagram of still another embodiment of a method for inventorying a tag according to this application.

Referring to FIG. 10, in this application, second signaling indicates that a target reader determines that second identity information is invalid, and the second signaling includes a first inventory identifier. The second signaling may be a NAK in an inventory process. After receiving a NAK sent by a reader, the target tag determines that a first inventory identifier in the NAK is the same as a second inventory identifier. In other words, it may be considered that the NAK received by the target tag matches a current inventory process of the target tag. Further, the target tag may perform a corresponding action and/or state transition for the NAK. For example, the target reader transitions to an arbitrate state. If the target tag determines that the first inventory identifier in the NAK is different from the second inventory identifier, it may be considered that the NAK received by the target tag is a NAK of another inventory process, and the NAK does not match the current ongoing inventory process of the target tag. Further, the target tag may ignore the NAK, and maintain an original state rather than transition to the arbitrate state.

In this application, in the method for inventorying a tag provided in this application, the target tag, in addition to implementing step 201 to step 203, may further receive third signaling sent by the target reader, and perform a corresponding action and/or state transition for the third signaling. The specific implementation is described in the following method example.

The target tag receives the third signaling sent by the target reader.

In this application, the third signaling is used to inventory first identity information of the target tag, and the third signaling includes the first inventory identifier. For example, the third signaling may be query signaling (Query) in an inventory process, and "Query" may include a first inventory identifier.

The target tag determines, based on the third signaling, that the first inventory identifier is the same as the second inventory identifier.

The target tag sends the first identity information to the target reader.

In this application, it is assumed that the third signaling is "Query" in a tag inventory process, and the first identity information is an RN16 in the inventory process. After receiving "Query" sent by a reader, the target tag determines that a first inventory identifier in "Query" is the same as the second inventory identifier. In other words, it may be considered that "Query" received by the target tag matches the current ongoing inventory process of the target tag. Further, the target tag may perform a corresponding action and/or state transition for "Query", for example, send the RN16 to the target reader. If the target tag determines that the first inventory identifier in "Query" is different from the second inventory identifier, it may be considered that "Query" received by the target tag does not match the current ongoing inventory process of the target tag. Further, the target tag may ignore "Query", and does not perform state transition or any processing, for example, does not send the RN16 to the target reader.

Figure 11:
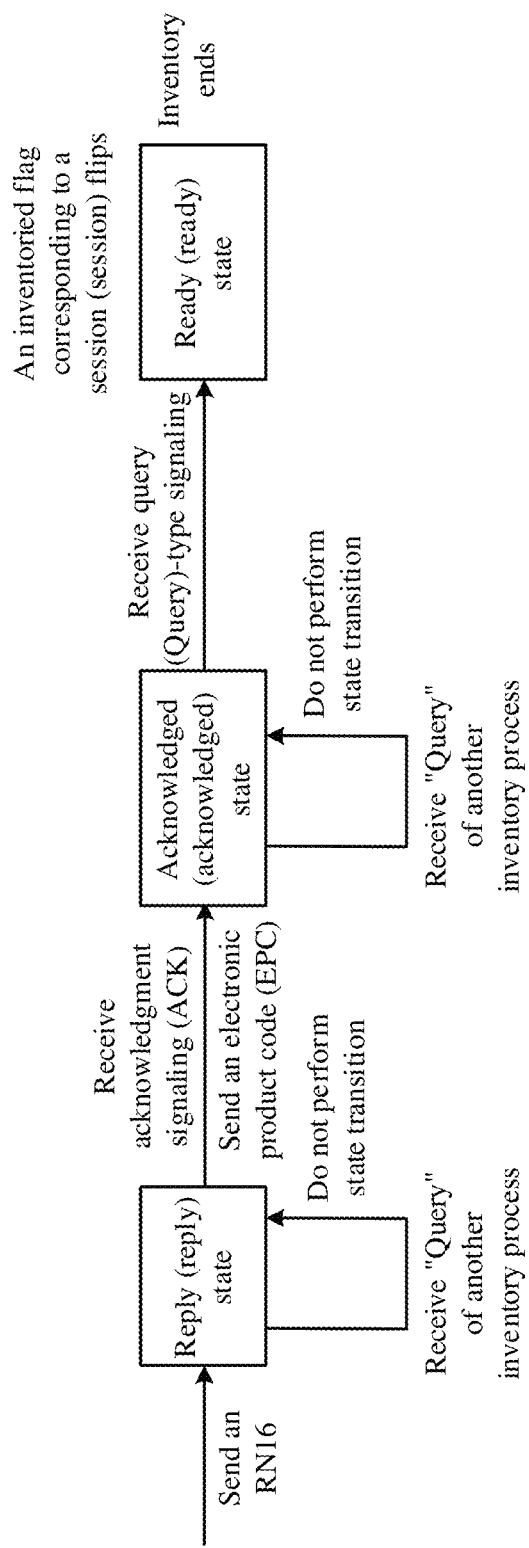
FIG. 11 is a schematic diagram of yet another embodiment of a method for inventorying a tag according to this application.

FIG. 11 is a schematic diagram of yet another embodiment of a method for inventorying a tag according to this application.

Referring to FIG. 11, in this application, when a tag is in a reply state or an acknowledged state, after receiving "Query", the tag determines whether a first inventory identifier in "Query" is the same as a second inventory identifier. If these two identifiers are different, it may be considered that "Query" received by the target tag does not match a current ongoing inventory process of the target tag. In this case, no processing or state transition is performed. Corresponding processing and/or state transition are/is performed only when "Query" matches the inventory process. Optionally, the tag may further consider whether an inventoried flag in query signaling matches the tag. For example, after receiving the query signaling, the tag determines whether the first inventory identifier, an inventory session sequence number and/or the inventoried flag in the query signaling match/matches a session sequence number, an inventoried flag and/or the second inventory identifier of the ongoing inventory process of the tag. If no information is matched, no processing or state transition is performed. Corresponding processing and/or state transition are/is performed only when the information is matched.

For example, when a tag 1 in an inventory process 1 receives "Query 2" of an inventory process 2, a current inventory process is not interrupted. After the tag 1 in the inventory process 1 feeds back an RN16, the tag 1 waits for an ACK 1 sent by a reader 1. At this time, the reader is in a reply state. However, "Query 2" sent by a reader 2 in the inventory process 2 is received. The tag 1 determines that a first inventory identifier included in "Query 2" is different from the second inventory identifier. In other words, it is considered that "Query 2" does not match the current inventory process of the tag 1, and the tag 1 does not transition to a ready state. Subsequently, the ACK 1 sent by the reader 1 is received, and then an EPC is sent to the reader 1 in response. The inventory process of a current round is not interrupted.

For example, after the tag 1 in the inventory process 1 feeds back the EPC, the inventory is completed. At this time, the tag 1 is in an acknowledged state. After receiving "Query 2" signaling of the inventory process 2, the tag 1 determines that the first inventory identifier included in "Query 2" is different from the second inventory identifier, that is, it is considered that "Query 2" does not match the current inventory process of the tag 1. In this case, the tag 1 does not perform state transition or any processing, for example, does not directly transition to the ready state after reception. The current inventory process is not interrupted, improving inventory efficiency and capacity.

In this application, in the method for inventorying a tag provided in this application, the first signaling, second signaling, and third signaling may further carry an ID of a reader in addition to an inventory identifier. The specific implementation is described in the following method example.

In this application, a plurality of readers may perform inventory in inventory processes at the same time. A plurality of readers may perform inventory processes at the same time. The solution described in the foregoing embodiment has distinguished between signaling and state, but different readers may still select a same inventory process identifier, which still affects tag inventory.

In this application, the first signaling, the second signaling, and/or the third signaling may include an ID of a target reader.

In this application, when the first signaling includes the ID of the target reader, after the target tag determines that a response list stored by the target tag includes the identity ID of the target reader, the target tag sends second identity information to the target reader.

For example, it is assumed that the first signaling is an ACK in a tag inventory process, first identity information is an RN16 in the inventory process, and the second identity information is an EPC in the inventory process. After receiving an ACK sent by a reader, the target tag determines that a first inventory identifier in the ACK is the same as the second inventory identifier, and determines that the response list stored by the target tag includes the identity ID of the target reader, or the target tag determines that an identity of the reader, in the inventory process in which the target tag participates, matches the identity of the target reader that sends the signaling. In other words, it may be considered that the ACK received by the target tag matches the current ongoing inventory process of the target tag. Further, the target tag may perform a corresponding action and/or state transition for the ACK, for example, send the EPC to the target reader. The response list may include IDs of one or more readers. This is not specifically limited herein. It is assumed that the target tag determines that the first inventory identifier in the ACK is different from the second inventory identifier, or determines that the response list stored by the target tag does not include the identity ID of the target reader, or the target tag determines that the identity of the reader, in the inventory process in which the target tag participates, does not match the identity of the target reader that sends the signaling. In other words, it may be considered that the ACK received by the target tag does not match the current ongoing inventory process of the target tag. Further, the target tag may ignore the ACK, and does not perform state transition or any processing for the ACK.

In this application, when the second signaling includes the ID of the target reader, after the target tag determines that the response list stored by the target tag includes the identity ID of the target reader, the target tag transitions to an arbitrate state after receiving the second signaling.

For example, it is assumed that the second signaling is a NAK in an inventory process. After receiving a NAK sent by a reader, the target tag determines that a first inventory identifier in the NAK is the same as the second inventory identifier, and determines that the response list stored by the target tag includes the identity ID of the target reader, or the target tag determines that an identity of the reader, in the inventory process in which the target tag participates, matches the identity of the target reader that sends the signaling. In other words, it may be considered that the ACK received by the target tag matches the current ongoing inventory process of the target tag. Further, the target tag may perform a corresponding action and/or state transition for the NAK. For example, the target reader transitions to the arbitrate state. If the target tag determines that the first inventory identifier in the NAK is different from the second inventory identifier, or determines that the response list stored by the target tag does not include the identity ID of the target reader, it may be considered that the NAK received by the target tag is a NAK of another inventory process, and the NAK does not match the current ongoing inventory process of the target tag. Further, the target tag may ignore the NAK, and maintain an original state rather than transition to the arbitrate state.

In this application, when the third signaling includes the ID of the target reader, after the target tag determines that the response list stored by the target tag includes the identity ID of the target reader, the target tag sends the second identity information to the target reader after receiving the second signaling.

In this application, it is assumed that the third signaling is "Query" in a tag inventory process, and the first identity information is an RN16 in the inventory process. After receiving "Query" sent by a reader, the target tag determines that a first inventory identifier in "Query" is the same as the second inventory identifier, and determines that the response list stored by the target tag includes the identifier ID of the target reader. In other words, it may be considered that "Query" received by the target tag matches the current ongoing inventory process of the target tag. Further, the target tag may perform a corresponding action and/or state transition for "Query", for example, send the RN16 to the target reader. If the target tag determines that the first inventory identifier in "Query" is different from the second inventory identifier, or determines that the response list stored by the target tag does not include the identity ID of the target reader, it may be considered that "Query" received by the target tag does not match the current ongoing inventory process of the target tag. Further, the target tag may ignore "Query", and does not send the RN16 to the target reader.

In this application, in a process in which a plurality of readers perform inventory at the same time, sets of first inventory identifiers and sets of session sequence numbers that can be used by the plurality of readers may be allocated to the readers in a plurality of manners.

Figure 12:
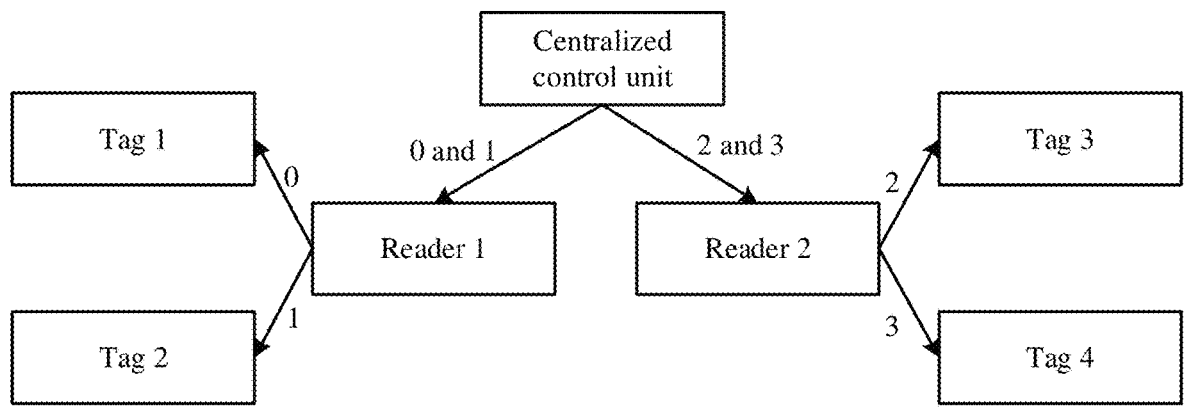
FIG. 12 is a schematic diagram of still yet another embodiment of a method for inventorying a tag according to this application.

FIG. 12 is a schematic diagram of still yet another embodiment of a method for inventorying a tag according to this application.

In this application, as shown in FIG. 12, a centralized control unit may notify a plurality of readers of sets of inventory identifiers that can be used by the readers, for example, notify a reader 1 to use first inventory identifiers of 0 and 1, and notify a reader 2 to use first inventory identifiers of 2 and 3, so as to avoid confusion of tags. After receiving the notification, each reader uses the notified set of first inventory identifiers to inventory tags.

Optionally, the centralized control unit may notify the reader of the set of inventory identifiers through application layer signaling such as RFID signaling, layer-2 signaling such as RRC signaling or MAC signaling, and physical layer signaling such as DCI. The centralized control unit may further notify the reader of the set of inventory identifiers through other signaling, which is not specifically limited herein.

In this application, a quantity of bits in the inventory identifier may be appropriately increased, for example, more than 4 bits, to prevent a conflict between inventory identifiers. In some embodiments, in the signaling, three bits may indicate an inventory identifier, and a length of the inventory identifier may be eight bits, so that a conflict between inventory identifiers can be further prevented.

Figure 13:
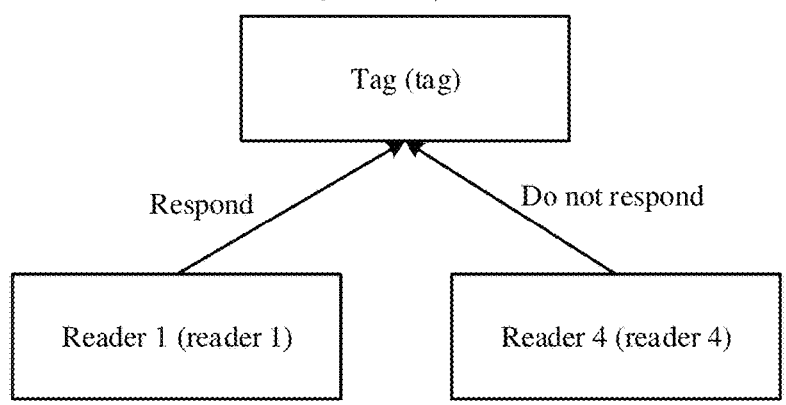
FIG. 13 is a schematic diagram of a further embodiment of a method for inventorying a tag according to this application.

FIG. 13 is a schematic diagram of a further embodiment of a method for inventorying a tag according to this application.

In this application, forward RFID signaling includes an ID of a reader, and a tag prestores a set of IDs of readers that need to be responded to. After receiving the RFID signaling, the tag determines whether the ID of the reader included in the RFID signaling is in the set. If the ID is not in the set, the tag does not perform state transition or any processing. The tag performs corresponding processing and/or state transition only when the ID is in the set.

In this application, in addition to inventory-related signaling (such as Select, Challenge, Query, QueryRep, QueryAdjust, ACK, and NAK) mentioned above, other signaling (such as Read, Write, and FileOpen) may also interrupt an original inventory process. For example, after a tag in an inventory process 1 feeds back an RN16, the tag waits for an ACK sent to the tag, and is in a reply state at this time. However, other signaling such as Read or Write in an inventory process 2 is received. The tag directly transitions to an arbitrate state without further determining of the signaling. Even if an ACK sent to the tag is received subsequently, the tag does not respond with an EPC. As a result, a current round of inventory process is interrupted. Solutions provided in the following embodiment may be used for other signaling, to ensure inventory efficiency.

Solution 1: Other signaling includes a temporary ID of the tag, which is an RN16 (a 16-bit random number) previously fed back by the tag. Then, the tag may determine whether the temporary ID matches a temporary ID previously fed back by the tag. If the temporary ID does not match the temporary ID previously fed back by the tag, no processing or state transition is performed. Corresponding processing and/or state transition are/is performed only when the temporary ID matches the temporary ID previously fed back by the tag.

Solution 2: Other signaling also includes an inventory identifier. After receiving other signaling, the tag determines whether the inventory identifier in the signaling matches an inventory identifier of an ongoing inventory process of the tag. If the inventory identifier does not match the inventory identifier of the ongoing inventory process of the tag, no processing or state transition is performed. Corresponding processing and/or state transition are/is performed only when the inventory identifier matches the inventory identifier of the ongoing inventory process of the tag.

In this application, in addition to the inventory-related states (such as a ready state, an arbitrate state, a reply state, and an acknowledged state) mentioned above, the issue described above also exists in other states (such as an open state and a secured state). Therefore, the state transition performed by the tag after receiving the RFID in the foregoing embodiment is also applicable to other states. Details are not described herein again.

In this application, optionally, a session sequence number may be different from the inventory identifier, and the signaling includes both. After receiving the signaling, the tag determines whether a first inventory identifier in the signaling matches a second inventory identifier corresponding to an ongoing inventory process of the tag. If the first inventory identifier does not match the second inventory identifier, no processing or state transition is performed. Corresponding processing and/or state transition are/is performed only when the first inventory identifier matches the second inventory identifier. It is assumed that in addition to a 2-bit session sequence number indicating a maximum of four sessions, the signaling may further include a 1-bit first inventory identifier indicating a maximum of two different inventory processes.

In this application, the RFID-related signaling, such as Query, QueryRep, ACK, and NAK, may alternatively be signaling that has a same or similar function but has a different name. This is not specifically limited herein.

In this application, a first device receives first signaling sent by a second device, where the first signaling includes a first inventory identifier. After determining, based on the first signaling, that the first inventory identifier is the same as a second inventory identifier, the first device sends identity information to the second device. Then, the first device may determine, based on an inventory identifier included in signaling sent by a reader, whether the signaling matches a current ongoing inventory process of the first device, to prevent mismatched signaling from interfering with a normal inventory process. The reader supports a plurality of inventory processes, which improves efficiency of tag inventory.

Figure 14:
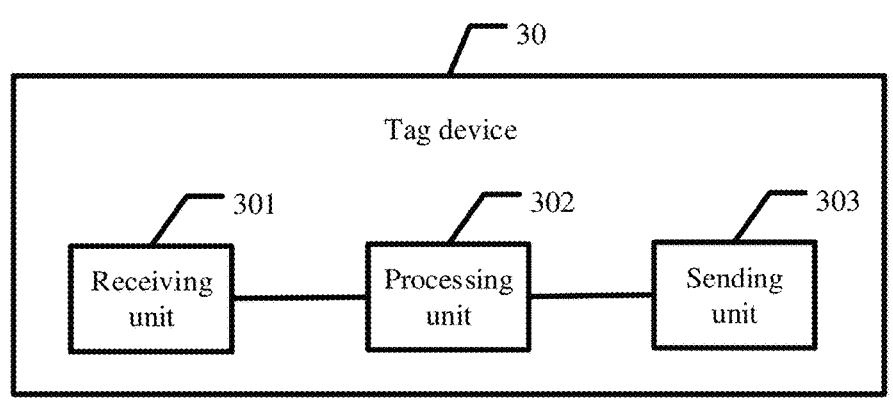
FIG. 14 is a schematic diagram of a structure of a tag device according to this application.

The foregoing examples provide different implementations of the method for inventorying a tag. The following provides a tag device 30. As shown in FIG. 14, the tag device 30 is configured to perform steps performed by a first device in the foregoing examples. For details about the execution steps and corresponding beneficial effects, refer to the foregoing corresponding examples for understanding. Details are not described herein again. The tag device 30 includes:

a receiving unit 301, configured to receive first signaling sent by a second device, where the first signaling indicates that the second device successfully receives first identity information sent by a first device and indicates the first device to send second identity information to the second device, the first signaling includes a first inventory identifier, and the first inventory identifier indicates an identifier of an ongoing inventory process of the second device;

a processing unit 302, configured to determine, based on the first signaling, that the first inventory identifier is the same as a second inventory identifier, where the second inventory identifier indicates an identifier of an ongoing inventory process of the first device; and a sending unit 303, configured to send the second identity information to the second device.

In some embodiments, the receiving unit 301 is further configured to receive second signaling sent by the second device. The second signaling indicates that the second device determines that the second identity information is invalid, and the second signaling includes the first inventory identifier.

In some embodiments, the receiving unit 301 is further configured to receive third signaling sent by the second device. The third signaling is used to inventory the first identity information of the first device, and the third signaling includes the first inventory identifier.

The processing unit 302 is further configured to determine, based on the third signaling, that the first inventory identifier is the same as the second inventory identifier.

The sending unit 303 is further configured to send the first identity information to the second device.

In some embodiments, the first signaling includes an ID of the second device.

The processing unit 302 is configured to determine that a response list stored by the first device includes the identity ID of the second device.

The sending unit 303 is configured to send the second identity information to the second device.

In some embodiments, the third signaling includes the ID of the second device.

The processing unit 302 is configured to determine that the response list stored by the first device includes the ID of the second device.

The sending unit 303 is configured to send the first identity information to the second device.

In some embodiments, the second signaling includes an ID of a reader.

In some embodiments, the tag is in a reply state or an acknowledged state before the sending unit receives the first signaling, the second signaling, and/or the third signaling.

It should be noted that, information exchange, an execution process, and the like between the modules of the tag device 30 are based on a same concept as method examples in this application, and execution steps are consistent with detailed content of the foregoing method steps. For details, refer to the descriptions in the foregoing method examples.

Figure 15:
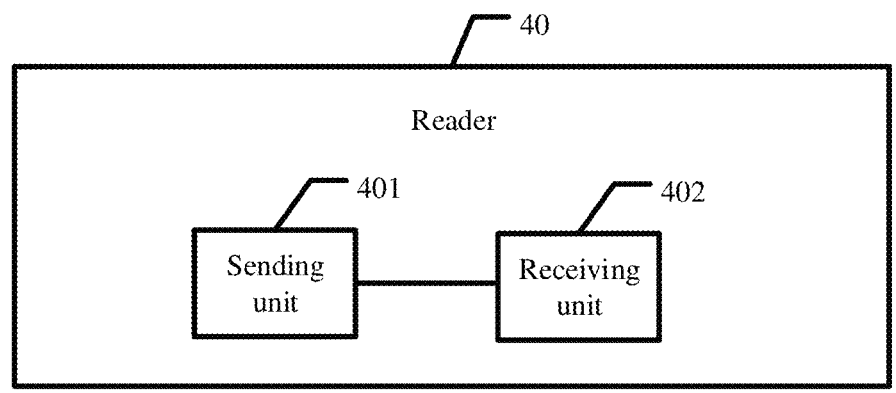
FIG. 15 is a schematic diagram of a structure of a reader according to this application.

The foregoing example provides different implementations of the tag device 30. The following provides a reader 40. As shown in FIG. 15, the reader 40 is configured to perform steps performed by a second device in the foregoing examples. For details about the execution steps and corresponding beneficial effects, refer to the foregoing corresponding examples for understanding. Details are not described herein again. The reader 40 includes:

a sending unit 401, configured to send first signaling to a first device, where the first signaling indicates that a second device successfully receives first identity information sent by the first device and indicates the first device to send second identity information to the second device, the first signaling includes a first inventory identifier, and the first inventory identifier indicates an identifier of an ongoing inventory process of the second device; and a receiving unit 402, configured to receive the second identity information sent by the first device.

In some embodiments, the sending unit 401 is configured to send second signaling to the first device, where the second signaling indicates that the second device determines that the second identity information is invalid, and the second signaling includes the first inventory identifier.

In some embodiments, the sending unit 401 is configured to send third signaling to the first device, where the third signaling is used to inventory the first identity information of the first device, and the third signaling includes the first inventory identifier; and the receiving unit 402 is configured to receive the first identity information sent by the first device.

In some embodiments, the first signaling, the second signaling, and/or the third signaling include/includes an ID of the second device.

It should be noted that, information exchange, an execution process, and the like between the modules of the reader 40 are based on a same concept as method examples in this application, and execution steps are consistent with detailed content of the foregoing method steps. For details, refer to the descriptions in the foregoing method examples.

Figure 16:
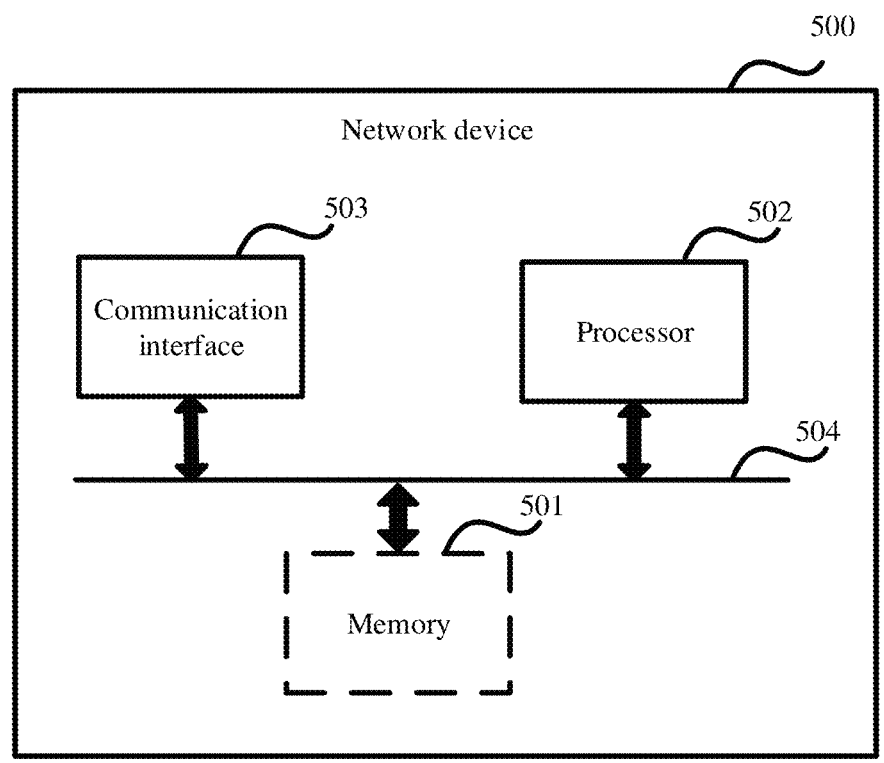
FIG. 16 is a schematic diagram of a structure of a network device according to this application.

FIG. 16 is a schematic diagram of a structure of a network device according to this application. The network device may be a tag device, or the network device may be a reader. This is not specifically limited herein. The network device 500 includes a processor 502, a communication interface 503, and a memory 501. Optionally, the network device 500 may include a bus 504. The communication interface 503, the processor 502, and the memory 501 are connected to each other through the bus 504. The bus 504 may be a peripheral component interconnect (Peripheral Component Interconnect, PCI) bus, an extended industry standard architecture (extended industry standard architecture, EISA) bus, or the like. The bus may be classified into an address bus, a data bus, a control bus, and the like. For ease of representation, only one thick line is used to represent the bus in FIG. 16, but this does not mean that there is only one bus or only one type of bus. The network device 500 may implement a function of the tag device in FIG. 14, or the network device 500 may implement a function of the reader in the example shown in FIG. 16. The processor 502 and the communication interface 503 may perform corresponding operations of the tag device or the reader in the foregoing method examples.

The following describes the components of the network device in detail with reference to FIG. 16.

The memory 501 may be a volatile memory (volatile memory), such as a random access memory (random access memory, RAM); or a non-volatile memory (non-volatile memory), such as a read-only memory (read-only memory, ROM), a flash memory (flash memory), a hard disk drive (hard disk drive, HDD), or a solid-state drive (solid-state drive, SSD); or a combination of the foregoing types of memories, configured to store program code, a configuration file, or other content for implementing the method in this application.

The processor 502 is a control center of a controller, and may be a central processing unit (central processing unit, CPU), or may be an application-specific integrated circuit (application-specific integrated circuit, ASIC), or one or more integrated circuits configured to implement the examples provided by this application, for example, one or more digital signal processors (digital signal processors, DSPs), or one or more field programmable gate arrays (field programmable gate arrays, FPGAs).

The communication interface 503 is configured to communicate with another network device.

The processor 502 may perform an operation performed by the tag device in the example shown in FIG. 14, or an operation performed by the reader in the example shown in FIG. 10. Details are not described herein again.

It should be noted that, information exchange, an execution process, and the like between the modules of the network device 500 are based on a same concept as method examples in this application, and execution steps are consistent with detailed content of the foregoing method steps. For details, refer to the descriptions in the foregoing method examples.

It may be clearly understood by a person skilled in the art that, for the purpose of convenient and brief description, for a detailed working process of the foregoing system, apparatus, and unit, refer to a corresponding process in the foregoing examples. Details are not described herein again.

In several examples provided in this application, it should be understood that the disclosed system, apparatus, and method may be implemented in other manners. For example, the described apparatus example is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the examples.

In addition, functional units in examples of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of a software functional unit and is sold or used as an independent product, the integrated unit may be stored in a storage medium. Based on such an understanding, the technical solutions of this application essentially, or the part contributing to the technology of some approaches, or all or some of the technical solutions may be implemented in a form of a software product. The computer software product is stored in a storage medium, and includes several instructions for instructing a computer device (which may be a personal computer, a server, a network device, or the like) to perform all or some of the steps of the method described in examples of this application. The foregoing storage medium includes any medium that can store program code, such as a USB flash drive, a removable hard disk, a read-only memory (ROM, read-only memory), a random access memory (RAM, random access memory), a magnetic disk, or an optical disc.

The objectives, technical solutions, and benefits of the present disclosure are further described in detail in the foregoing specific implementations. It should be understood that different examples may be combined, and the foregoing descriptions are merely specific implementations of the present disclosure, but are not intended to limit the protection scope of the present disclosure. Any combination, modification, equivalent replacement, improvement, or the like made without departing from the spirit and principle of the present disclosure shall fall within the protection scope of the present disclosure. The foregoing examples are merely intended for describing the technical solutions of this application, rather than limiting this application. Although this application is described in detail with reference to the foregoing examples, a person of ordinary skill in the art should understand that they may still make modifications to the technical solutions described in the foregoing examples or make equivalent replacements to some technical features thereof, without departing from the scope of the technical solutions of examples of this application.

What is claimed is:

1. A method, comprising:
receiving, by a first device, first signaling from a second device, wherein the first signaling is useable to indicate that the second device successfully received first identity information from the first device and is useable to indicate to the first device to send second identity information to the second device, the first signaling comprises a first inventory identifier, and the first inventory identifier is useable to indicate an identifier of an ongoing inventory process of the second device;
determining, by the first device based on the first signaling, that the first inventory identifier is the same as a second inventory identifier, wherein the second inventory identifier is useable to indicate an identifier of an ongoing inventory process of the first device; and
sending, by the first device, the second identity information to the second device;
wherein the first signaling comprises an identity (ID) of the second device, and
the sending, by the first device, the second identity information to the second device comprises:
determining, by the first device, that a response list stored by the first device comprises the ID of the second device; and
sending, by the first device, the second identity information to the second device.

2. The method according to claim 1, wherein the method further comprises:
receiving, by the first device, second signaling from the second device, wherein the second signaling is useable to indicate that the second identity information is invalid, and the second signaling comprises the first inventory identifier.

3. The method according to claim 1, wherein the method further comprises:
receiving, by the first device, third signaling from the second device, wherein the third signaling is useable to inventory the first identity information of the first device, and the third signaling comprises the first inventory identifier;
determining, by the first device based on the third signaling, that the first inventory identifier is the same as the second inventory identifier; and
sending, by the first device, the first identity information to the second device.

4. The method according to claim 3, wherein
the third signaling comprises an identity (ID) of the second device, and
the sending, by the first device, the first identity information to the second device comprises:
determining, by the first device, that a response list stored by the first device comprises the ID of the second device; and
sending, by the first device, the first identity information to the second device.

5. The method according to claim 3, wherein
a tag is in a reply state or an acknowledged state before the first device receives the first signaling, the second signaling, or the third signaling.

6. The method according to claim 1, wherein the second signaling comprises an identity (ID) of the second device.

7. A method, comprising:
sending, by a second device, first signaling to a first device, wherein the first signaling is useable to indicate that the second device successfully received first identity information from the first device and is useable to indicate to the first device to send second identity information to the second device, the first signaling comprises a first inventory identifier, and the first inventory identifier is useable to indicate an identifier of an ongoing inventory process of the second device; and
receiving, by the second device, the second identity information from the first device,
wherein the first signaling comprises an identity (ID) of the second device, and
the receiving, by the second device, the second identity information from the first device comprises:
determining that a response list that is stored in the first device comprises the ID of the second device; and
receiving, by the second device, the second identity information from the first device.

8. The method according to claim 7, wherein the method further comprises:
sending, by the second device, second signaling to the first device, wherein the second signaling is useable to indicate that the second device determined that the second identity information is invalid, and the second signaling comprises the first inventory identifier.

9. The method according to claim 7, wherein the method further comprises:
sending, by the second device, third signaling to the first device, wherein the third signaling is useable to inventory the first identity information of the first device, and the third signaling comprises the first inventory identifier; and
receiving, by the second device, the first identity information from the first device.

10. A first device, comprising:
at least one processor; and
a memory coupled to the at least one processor and configured to store non-transitory instructions, and the at least one processor configured to execute the non-transitory instructions thereby causing the first device to:
receive first signaling from a second device, wherein the first signaling is useable to indicate that the second device successfully received first identity information from a first device and is useable to indicate to the first device to send second identity information to the second device, the first signaling comprises a first inventory identifier, and the first inventory identifier is useable to indicate an identifier of an ongoing inventory process of the second device;
determine, based on the first signaling, that the first inventory identifier is the same as a second inventory identifier, wherein the second inventory identifier is useable to indicate an identifier of an ongoing inventory process of the first device; and
send the second identity information to the second device;
wherein the first signaling comprises an identity (ID) of the second device, and
the at least one processor being configured to execute the non-transitory instructions thereby causing the first device to send the second identity information to the second device, comprises:
determining that a response list stored by the first device comprises the ID of the second device; and
sending the second identity information to the second device.

11. The first device according to claim 10, wherein the at least one processor being further configured to execute the non-transitory instructions thereby further causing the first device to:
　receive second signaling from the second device, wherein the second signaling is useable to indicate that the second identity information is invalid, and the second signaling comprises the first inventory identifier.

12. The tag device according to claim 10, wherein the at least one processor being further configured to execute the non-transitory instructions thereby further causing the first device to:
　receive third signaling from the second device, wherein the third signaling is useable to inventory the first identity information of the first device, and the third signaling comprises the first inventory identifier;
　determine, based on the third signaling, that the first inventory identifier is the same as the second inventory identifier; and
　send the first identity information to the second device.

13. The tag device according to claim 12, wherein the third signaling comprises an identity (ID) of the second device;
　wherein the at least one processor being configured to execute the non-transitory instructions thereby causing the first device to send the first identity information to the second device, comprises:
　determining that a response list stored by the first device comprises the ID of the second device; and
　sending the first identity information to the second device.

14. The tag device according to claim 10, wherein the second signaling comprises an identity (ID) of the second device.

15. The tag device according to claim 10, wherein a tag is in a reply state or an acknowledged state before the first device receives the first signaling, the second signaling, or the third signaling.

16. A second device, comprising:
　at least one processor; and
　a memory coupled to the at least one processor and configured to store non-transitory instructions, and the at least one processor configured to execute the non-transitory instructions thereby causing the second device to:
　send first signaling to a first device, wherein the first signaling is useable to indicate that a second device successfully received first identity information from the first device and is useable to indicate to the first device to send second identity information to the second device, the first signaling comprises a first inventory identifier, and the first inventory identifier is useable to indicate an identifier of an ongoing inventory process of the second device; and
　receive the second identity information from the first device,
　wherein the first signaling comprises an identity (ID) of the second device, and
　the at least one processor being configured to execute the non-transitory instructions thereby causing the second device to receive the second identity information from the first device, comprises:
　determining that a response list that is stored in the first device comprises the ID of the second device; and
　receiving, by the second device, the second identity information from the first device.

17. The second device according to claim 16, wherein the at least one processor being configured to execute the non-transitory instructions thereby further causing the second device to:
　send second signaling to the first device, wherein the second signaling is useable to indicate that the second device determined that the second identity information is invalid, and the second signaling comprises the first inventory identifier.

18. The reader according to claim 16, wherein the at least one processor being configured to execute the non-transitory instructions thereby further causing the second device to:
　send third signaling to the first device, wherein the third signaling is useable to inventory the first identity information of the first device, and the third signaling comprises the first inventory identifier; and
　receive the first identity information from the first device.

* * * * *